United States Patent [19]
Olson

[11] Patent Number: 5,219,468
[45] Date of Patent: Jun. 15, 1993

[54] METHOD FOR DEWATERING USING ADDITION OF WATER TO FACILITATE MATERIAL MOVEMENT

[76] Inventor: David A. Olson, 1708 Roberts Dr., Albert Lea, Minn. 56007

[21] Appl. No.: 963,012

[22] Filed: Oct. 19, 1992

Related U.S. Application Data

[60] Continuation of Ser. No. 820,131, Jan. 13, 1992, abandoned, which is a division of Ser. No. 468,059, Jan. 22, 1990, abandoned, which is a continuation-in-part of Ser. No. 95,162, Sep. 11, 1987, Pat. No. 4,897,194.

[51] Int. Cl.$^5$ .......................................... B01D 37/00
[52] U.S. Cl. ........................................ 210/769; 34/14; 100/41; 100/129; 210/771; 210/773; 210/805
[58] Field of Search ................ 210/416, 769, 770, 771, 210/805; 100/35, 41, 127, 128, 129; 34/10, 14, 17, 22

[56] References Cited

U.S. PATENT DOCUMENTS

| | | | |
|---|---|---|---|
| 117,075 | 7/1871 | Holbrook | 100/129 |
| 292,593 | 1/1884 | Seeley et al. | 100/127 |
| 829,315 | 8/1906 | Anderson | 100/127 |
| 879,197 | 2/1908 | Shirmer | 210/770 |
| 1,854,270 | 4/1932 | McGilton | 210/770 |
| 3,370,358 | 2/1968 | Esser et al. | 34/17 |
| 3,520,411 | 7/1970 | Busse et al. | 210/770 |
| 4,055,001 | 10/1977 | Forster et al. | 34/17 |
| 4,234,429 | 11/1980 | Rhodes et al. | 210/771 |
| 4,851,136 | 7/1989 | Farqing et al. | 210/798 |
| 4,897,205 | 1/1990 | Landry | 210/773 |

FOREIGN PATENT DOCUMENTS

| | | | |
|---|---|---|---|
| 61774 | 12/1939 | Norway | 100/148 |
| 283362 | 1/1950 | Switzerland | 100/148 |

OTHER PUBLICATIONS

Stord Bartz Twin Screw Press Brochure, date unkown.
Reitz S-Press Dewatering Machine Brochure, date unknown.
Liquid Extraction Systems, Inc. "F" Press Dewatering, date unknown Machine Brochure.
Freeman Moisture Extractor Brochure, date unknown.
Dupps Company Dewaterer Brochure, date unknown.

Primary Examiner—Joseph W. Drodge
Attorney, Agent, or Firm—Burd, Bartz & Gutenkauf

[57] ABSTRACT

A liquid separator apparatus to extract liquid, usually water, from a water-solids mixture. The apparatus includes liquid separator device with a housing with an inlet and an outlet separated by a liquid extraction chamber. The housing sidewalls defining the extraction chamber are porous, and are preferably comprised as a plurality of spaced apart slats. The slats can be movable inwardly and outwardly relative to the housing in order to vary the volume of the extraction chamber. A transfer pipe has an outlet end connected to the inlet of the separator device. The transfer pipe is closed-walled and has an inlet end connectable to a solids material moving apparatus such as a solids pump for movement of a water-solids mixture through the transfer pipe into the liquid separator device. A source of air under pressure such as an air compressor introduces compressed air into a side wall of the transfer pipe to accelerate removal of water from the water-solids mixture.

4 Claims, 6 Drawing Sheets

METHOD FOR DEWATERING USING ADDITION OF WATER TO FACILITATE MATERIAL MOVEMENT

Cross Reference To Related Application

This is a continuation of application Ser. No. 820,131 filed Jan. 13, 1992, now abandoned, which is a division of application Ser. No. 07/468,059, filed on Jan. 22, 1990, now abandoned which is a continuation-in-part of application Ser. No. 07/095,162 filed Sept. 11, 1987, now U.S. Pat. No. 4,897,194.

BACKGROUND OF THE INVENTION

When insoluble, solid, discrete matter is transported with liquid, typically water, at some point it is often desirable to separate much of the water from the solid material. This is true whether the water and solid material are a waste product or whether the water is added to facilitate transport of the solid, or both. Water-entrained solid matter waste products are common. Efficient disposal of such product dictates removal of much water before disposition. One way of doing this is with a liquid separator. An example is the separation of water from turkey-feather water slurry that results as a byproduct of turkey processing. Other uses are for canneries, pulp mills, food processors, bagasse, and the like. Silage is a commonly transported water-solids combination. Slurries are commonly used to move solid material from place to place. The water-solids combination moves with less friction than the solid itself. New solid material moving pumps have made this method of material transport feasible.

Typically, the water-solid mixture contains between 85 to 95 percent water. Below this range, the material becomes difficult to pump. If, through the use of a liquid separator, the water content is reduced to the range of 50 to 70 percent, the weight of the mixture is reduced a great deal. The resultant material is much more concentrated and susceptible of disposition with less pollution consequence. Various devices utilizing augers and presses are presently used for liquid separation. Present machines employ mechanical plugs controllable to maintain pressure in the material to extract fluid.

SUMMARY OF THE INVENTION

The invention pertains to a liquid separator to separate liquid, usually water, from a water-solid mixture of the type with insoluble discrete solid matter, somewhat compressible and usually fiberous, combined with an amount of water in a mixture of initially between 85 and 95 percent water. The liquid separator is effective to separate water from the mixture to a point of 50 to 70 percent water thereby effectively more than doubling the concentration of the solid matter.

The liquid separator has an inlet end and an outlet end separated by a porous housing defining an unobstructed liquid extraction chamber to extract liquid from a subject mixture moving longitudinally from inlet to outlet under the influence of a material moving pump. Side walls of the chamber have a porosity generated by longitudinally unobstructed openings permitting passage of water separated from the subject mixture. The walls are movable inwardly and outwardly relative to the chamber. The movable walls enable expansion of the volume of the extraction chamber to cause a squeezing force to be exerted on the mixture. Bias means tend to move or hold the side walls toward a contracted configuration. As the water-entrained subject mixture is introduced to the chamber, it tends to expand the chamber against the influence of the bias means. The force provided against the subject mixture by the material moving pump and the amount of expansion of the chamber against the bias means are functionally related along with the solid density and material characteristics of the subject mixture. The sliding friction of the mixture against the porous side walls generated by the force of the material moving pump results in water being squeezed from the mixture and moving through the porous side walls. Material movement is unobstructed through the chamber but against the frictional and pressure influences of as a result of the bias means. Once equilibrium flow is established, the material froms a self-perpetuating flow restricting plug effective in the liquid extraction process. The chamber volume adjusts automatically according to the nature of the mixture and the amount of water removed. Most of the water is removed in the initial portion of the extraction chamber.

In a preferred embodiment, the porous side walls are formed by parallel slats spaced apart to provide a porosity for water passage through the side walls. The slats can be formed in a spaced apart cylindrical configuration held by elastic rings generating a porosity over the entire side wall of the housing. Chamber volume increases upon separation of the slats against the bias of the rings. Each slat is pivotally connected at the inlet end. The outlet end of each is movable in and out to vary the volume of the chamber. In another form of the invention, a porous wall is formed by a plurality of parallel spaced apart slats having spaces between them and formed in a planar relationship. A movable wall opposes a fixed wall forming the water extraction chamber. A biasing means is provided by a compression spring assembly.

In a modification of the invention, compressed air is introduced into a transition pipe leading to the liquid separator. The compressed air has the effect of accelerating the dewatering process.

IN THE DRAWINGS

FIG. 5 is a sectional view of a portion of the liquid separator of FIG. 4 taken along the line 5—5 thereof;

DESCRIPTION OF PREFERRED EMBODIMENTS

Figure 1:
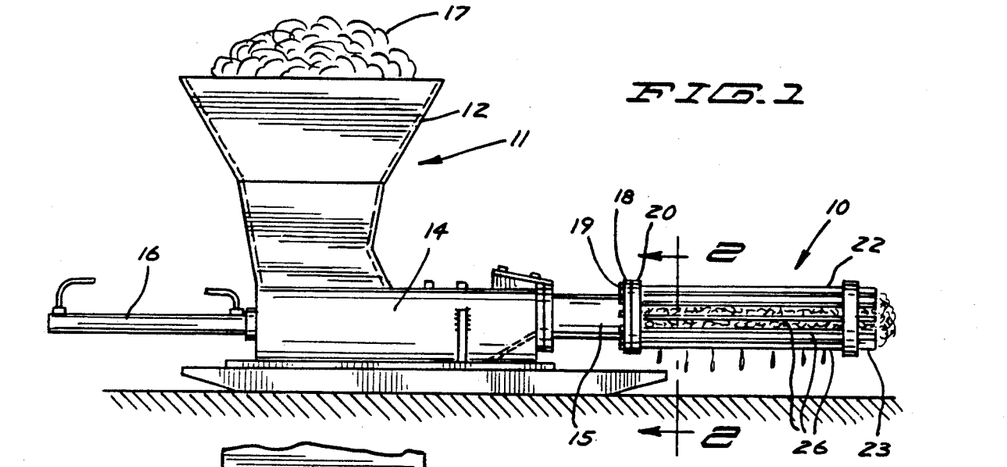
FIG. 1 is a side elevational view of a liquid separator according to the invention connected to a solid material moving pump.

Referring to the drawings, FIGS. 1 through 5 show a liquid or water separator according to the invention indicated generally at 10 in FIG. 1 mounted with respect to a solid material pump 11 supported on a platform 13. Pump 11 has an inlet hopper 12 which transfers material to a pumping chamber 14 for discharge through an outlet section 15. Material is pumped by a piston (not shown) in the chamber 14 driven by a reciprocating hydraulic motor 16. Outlet flange 18 surrounds the outlet of the discharge section 15 and is connected by a plurality of bolts 19 to a circular inlet flange 20 defining an inlet end to the liquid separator 10.

Liquid separator 10 is adapted for separation or extraction of water or other liquid from a water-solids mixture. This comprises a mixture, referred to herein as a subject mixture, of water and compressible, insoluble usually fiberous solid material in large or small discrete particulate form that generally has at least some moisture absorbent characteristics so as to absorb liquid and retain at least some of it until squeezed at which time a certain portion of the retained liquid is released. Examples are mixtures of water and hog hair, corn silage, feathers and such material. The subject mixture 17 is fed into hopper 12 by suitable conventional means such as a conveyor or loader (not shown), having a water content approximately between 85 percent and 95 percent. Such a mixture is readily pumped by known solid material moving equipment. Reduction of a fraction of the water from such a mixture will greatly increase the solids concentration to better condition it for waste disposal or for further processing. Water separator 10 is readily capable of reducing the water concentration of a typical subject mixture to the 50 to 70 range percent so as to at least double the solids concentration.

Water separator 10 is mounted cantileverly to pump 11. An inlet and mounting flange 20 is connected to an elongate, longitudinal, porous housing 22 having a discharge or outlet end 23. Housing 22 defines a variable volume longitudinal extraction chamber 24 which is unobstructed and defined by housing walls having a porosity generated by continuous, longitudinal unobstructed openings or slots to permit discharge of water. More particularly, housing 22 is formed of a plurality of parallel rails or slats 26 arranged in a generally cylindrical configuration. The slats are circumferentially spaced apart to provide longitudinal, unobstructed openings for discharge of water from the extraction chamber 24. The slats are rectangular in cross section and are relatively narrow (see FIGS. 2 through 5) with the length dimension radially orientated. The slats 26 have longitudinal openings 27 between them. The openings 27 have a depth which corresponds to the cross sectional length of the slats 26.

Figures 2, 3:
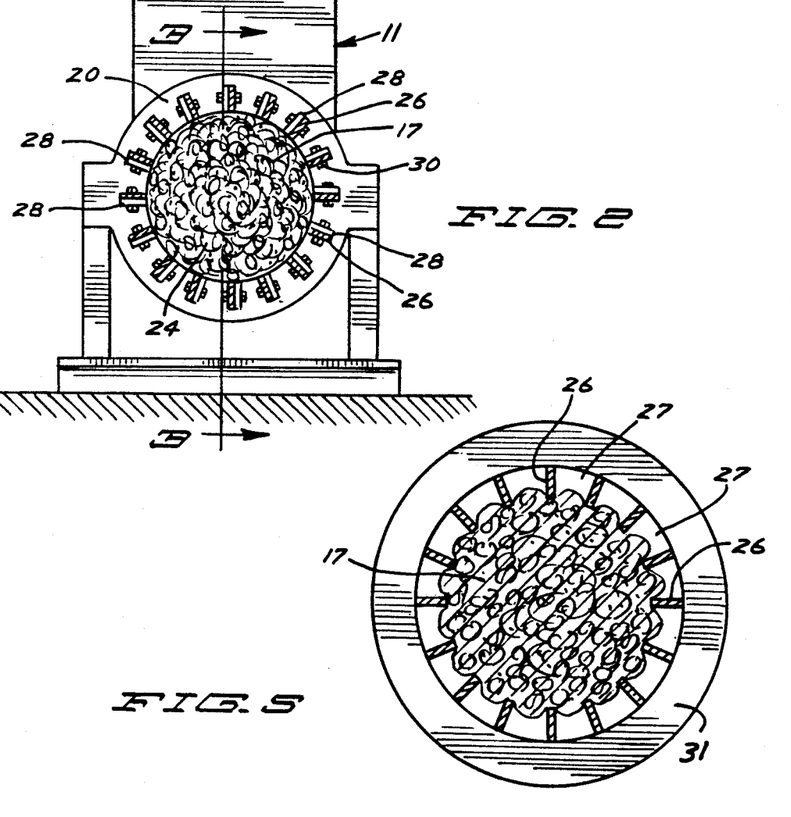
FIG. 2 is an enlarged sectional view of a portion of the liquid separator and pump of FIG. 1 taken along the line 2—2 thereof.
FIG. 3 is a sectional view of the liquid separator and a portion of the pump of FIG. 2 taken along the line 3—3 thereof and showing the extraction chamber empty.
Figure 3:
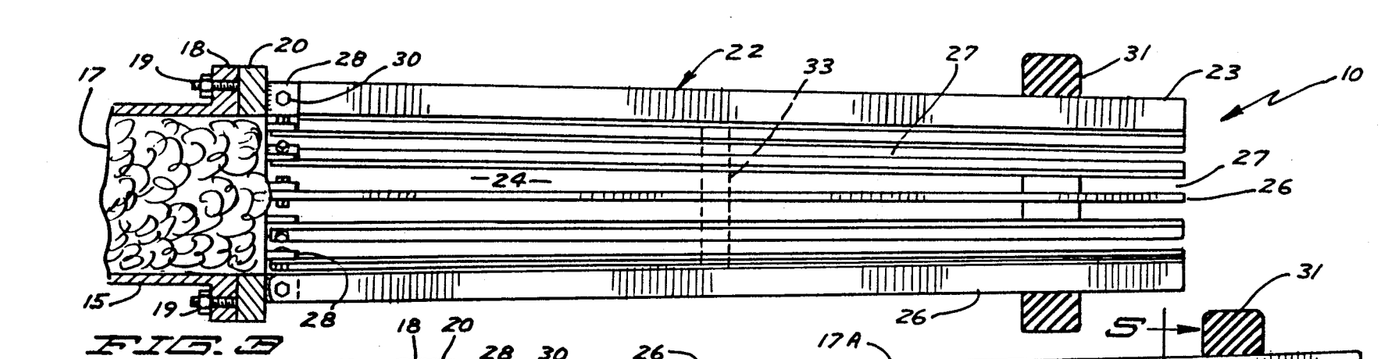

The slats 26 are pivotally fixed at the inlet end of chamber 24. As shown in FIGS. 2 and 3, a plurality of mounting lugs 28 are fixed or welded to mounting flange 20 and circumferentially arranged about the inlet opening of flange 20. A pivot pin assembly 30 which can be comprised of a nut and bolt assembly or other suitable means pivotally connects the rearward or upstream end of each slat 26 for pivotal movement about axes perpendicular to the longitudinal axis of chamber 24 as well as perpendicular to the reslutant intended direction of movement of subject mixture 17. The opposite or downstream ends of the slats 26 are pivotally movable in and out with respect to the chamber 24 resulting in cross-sectional variation of the diameter of chamber 24 along the length thereof and variation of the volume of chamber 24.

Means are provided to normally bias the downstream ends of the slats 26 inward of chamber 24. A spring member or elastic ring 31 is positioned at a downstream location in surrounding relationship to the slats 26. Ring 31 is a suitable elastic material such as rubber to provide a spring force proportionate to deflection. Slats 26 pivot outwardly or in a direction to expand the volume of chamber 24 against the force or bias of ring 31 which increases linearly with deflection. Ring 31 can be longitudinally adjustable to vary the biasing force it provides. In the empty chamber configuration of FIG. 3, relaxed ring 31 is of a size and has an internal diameter of a dimension to slightly restrict the diameter of chamber 24 as compared to that of inlet 20. Chamber 24 initially assumes a truncated conical shape with a diameter at the outlet 23 slightly smaller than the diameter at the inlet 20. Depending upon the material to be pumped and other conditions, ring 31 could be dimensioned such that chamber 24 would have an initially uniform cross-section diameter.

Figures 4, 6:
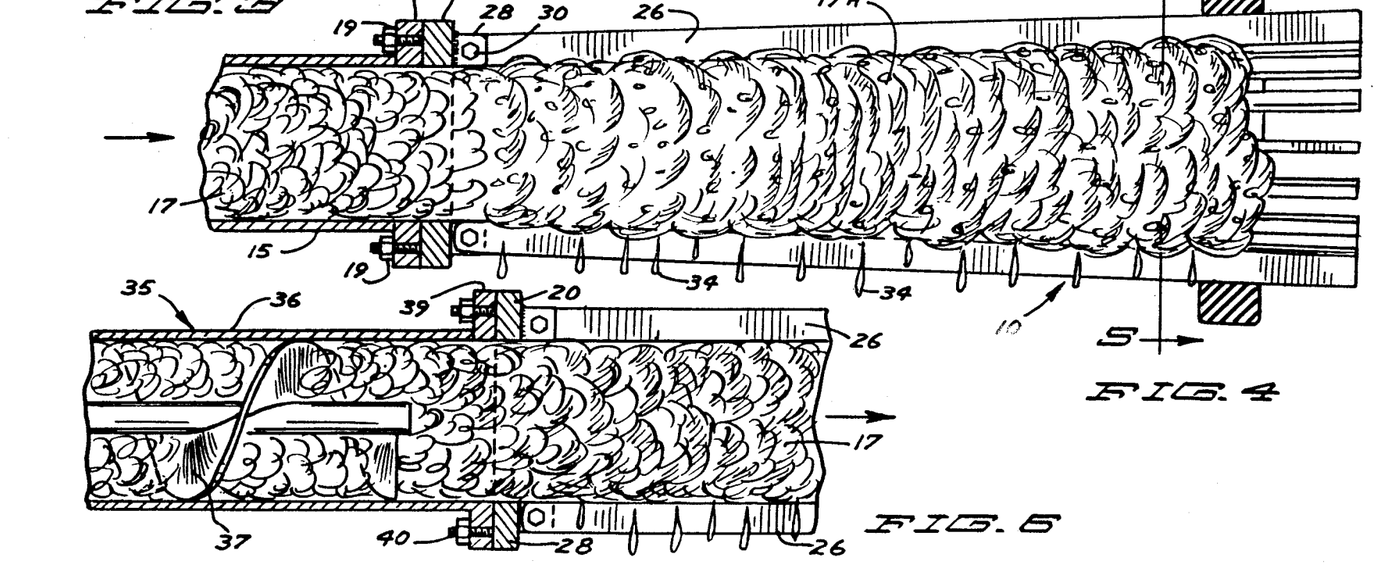
FIG. 4 is a sectional view like that of FIG. 3 showing the extraction chamber filled with a subject mixture.
FIG. 6 is an enlarged view of a liquid separator like that shown in FIG. 4 attached to an alternative material moving apparatus.

In use, subject mixture 17 to be dewatered is deposited in hopper 12 of pump assembly 11 and is moved through discharge 15 to water separator 10 which is initially empty as shown in FIG. 3. Subject mixture 17 enters and substantially fills chamber 24. The initial convergence of chamber 24 causes a build-up or dewatering mass of subject mixture just downstream of the inlet 20. Alternatively, such an initial build-up can be precipitated by placement of a movable plug in chamber 23 (indicated in phantom at 33). The plug causes an initial upstream build-up or partial blockage of material. The plug is eventually pushed out of the chamber. Pressure increases behind the blockage. The initial blockage causes water to separate while enough outward presure is created for expansion of chamber 24 by pushing slats 26 outward. FIG. 4 shows a density increase of subject mixture 17 a short distance ahead of inlet 20. As the slats are pushed outward resistance to flow is decreased and dewatered material begins movement toward the outlet. As water is eliminated, friction between the material and the slats increases. The force of the pump assembly 11 moving additional material into the inlet 20 against the subject mixture 17 already there is resisted by the squeezing force exerted by the slats and by the frictional force between the slats and the moving material. The friction force is also increased by the inward force exerted by the slats 26 in the expanded chamber 24. As a result, a good deal of the water entrained in the subject mixture 17 is squeezed out and falls through the openings 27 between the slats 26 as indicated at 34 in FIG. 4. A dewatering region is established in the vicinity of a self-perpetuating flow restricting plug usually toward the inlet half. Longitudinally unobstructed openings 27 offer little resistance to movement of the subject mixture 17 along the chamber 24. Along the surface friction and relative entanglement of the solid material, this results in little or no loss of solid material through the openings between the slats. The lack of obstruction in the slat openings minimizes clogging. The resultant material emerging at outlet 23 has much of the entrained water removed and is ready for further processing transport or disposition.

The amount of expansion of chamber 24 is shown exaggerated in FIG. 4 for purposes of illustration, but will vary dependent upon the water content of the subject mixture and the properties of the solid material. The chamber volume corresponds inversely to the amount of force exerted by ring 31 and automatically adjusts according to the properties of the subject mixture 17. Water is removed from the subject mixture 17 primarily through friction imparted upon the mixture and through a squeezing force exerted by the slats 26. The squeezing force is not only effective to remove water but it also increases the friction needed to move the material forward in the chamber. This results in further water loss.

In testing, it has been found that a high water content hog hair mixture creates a dewatering plug or partial blockage early in the chamber. The resultant solid mass is relatively inelastic and moves readily from the chamber to the outlet. Feathers and corn silgage form a dewatering block somewhat further down the chamber, with some initial slot blockage upstream in the chamber. The resultant solid mass is somewhat more elastic due to the fluid absorbent quality of the material. In order to achieve optimal pumping and dewatering for a particular subject mixture, emperical adjustments can be made such as slat spacing and number; location; number and spacing of the holding rings; and the chamber length and diameter.

Water separator 10 is usable with material moving apparatus other than a pump assembly like that shown. In FIG. 6, an auger assembly 35 includes a cylindrical auger housing 36 containing an auger flight 37. A housing flange 39 is connected by nut and bolt assemblies 40 to the inlet flange 20 of the water separator 10. The inlet to the auger assembly 35 can be in any conventional suitable place such as a place of silage collection or the like. Operation of the auger 37 is effective to move subject mixture 17 through the auger housing 36 and into the inlet 20 of the water separator 10 for water removal as previously described.

Figure 7:
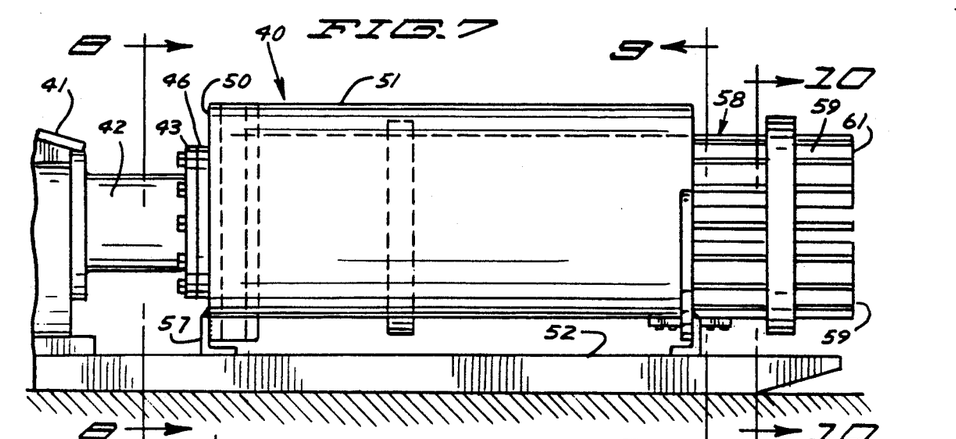
FIG. 7 is a side elevational view of a liquid separator according to a second form of the invention.
Figures 8, 9, 10:
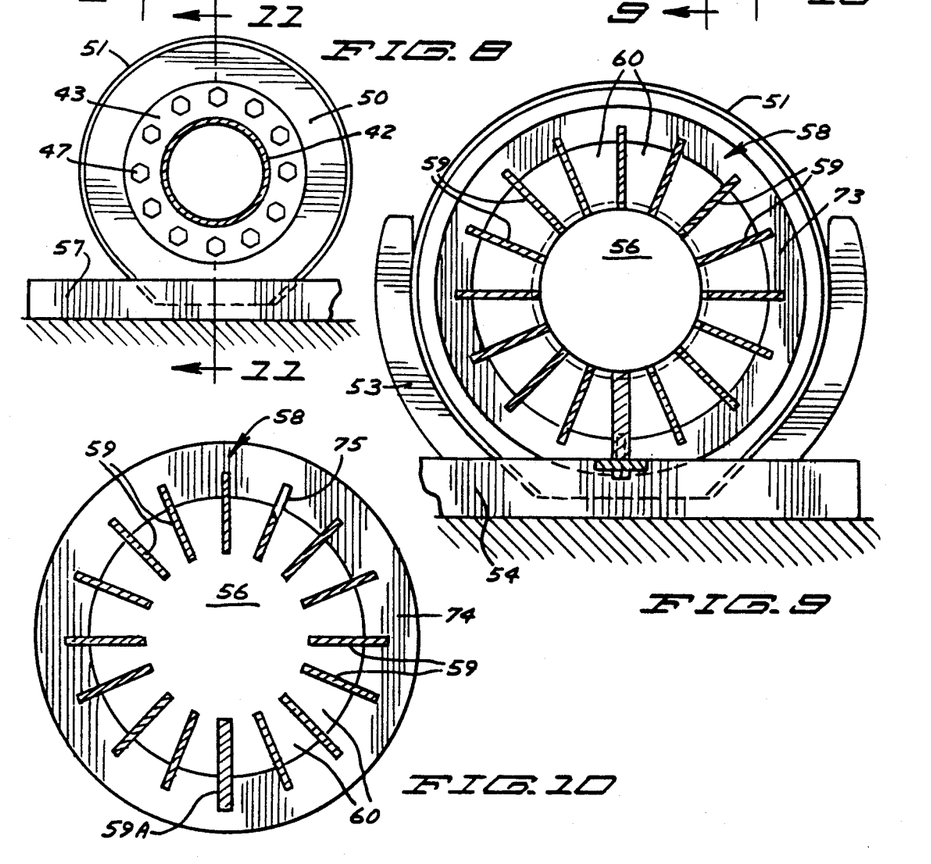
FIG. 8 is a view partly in section of a portion of the liquid separator of FIG. 7 taken along the line 8—8 thereof.
FIG. 9 is an enlarged sectional view of a portion of the liquid separator of FIG. 7 taken along the line 9—9 thereof.
FIG. 10 is still another enlarged sectional view of a portion of a liquid separator of FIG. 7 taken along the line 10—10 thereof.
Figure 11:
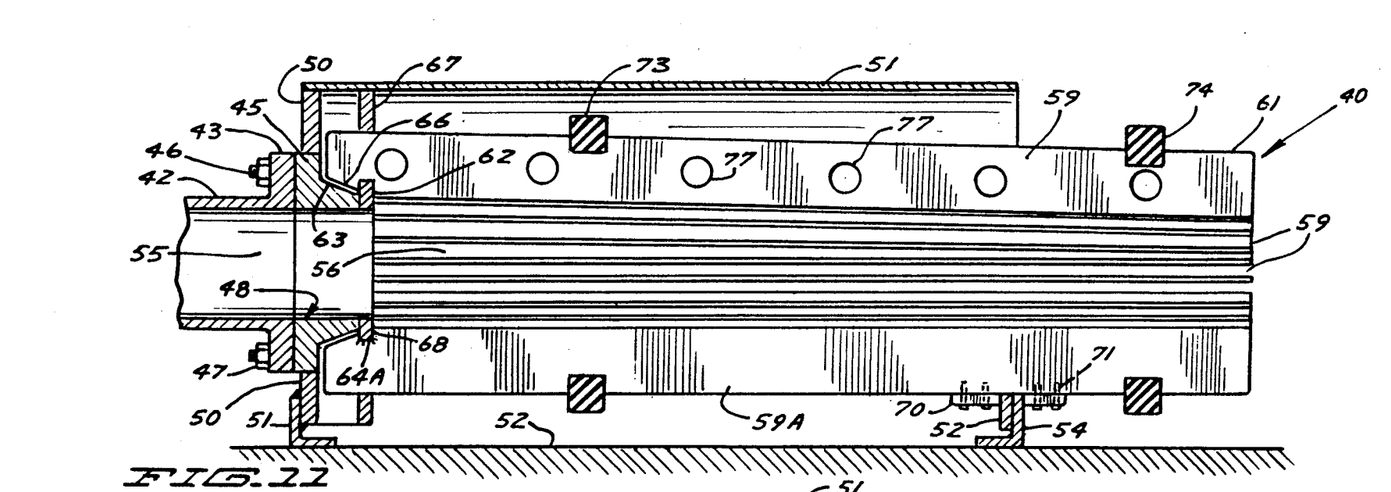
FIG. 11 is an enlarged sectional view in side elevation of the liquid separator shown in FIG. 8 taken along the line 11—11 thereof showing the extraction chamber empty.
Figure 12:
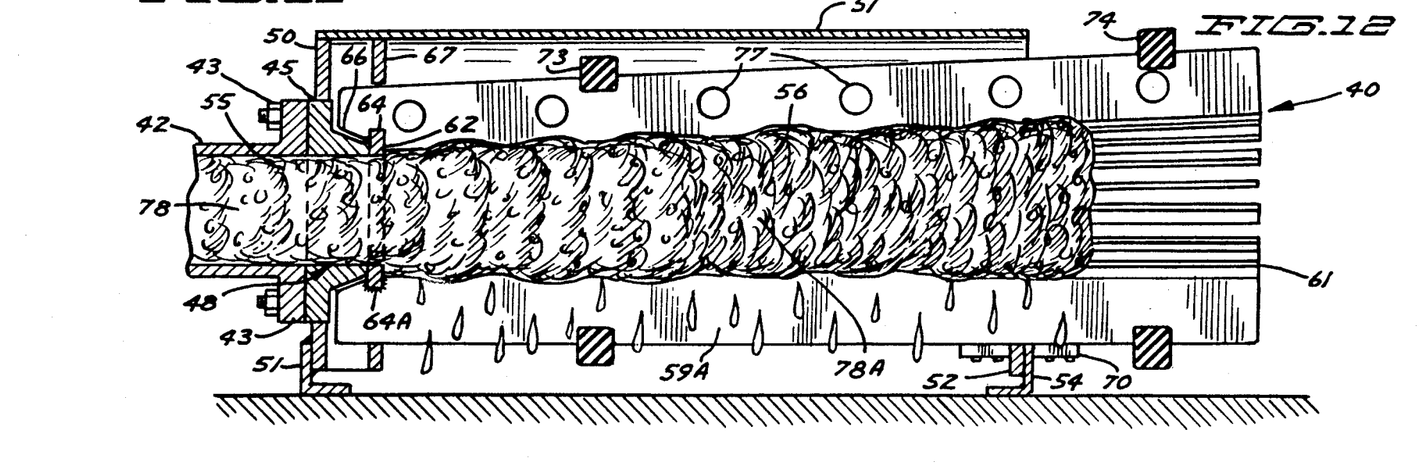
FIG. 12 is a view of the liquid separator like that of FIG. 11 but with the extraction chamber filled with subject material.

A second form of water separator according to the invention is shown in FIGS. 7 through 12. A water separator indicated generally at 40 in FIG. 7 is connected to a pump 41 having a discharge pipe 42 and an outlet flange 43 at the end of pipe 42. Outlet flange 43 is connected to an inlet flange 45 of water separator 40. A plurality of bolts 46 extending rearwardly from the inlet flange 45 are fastened by nuts 47. Inlet flange 45 comprises the rearward portion of an inlet nozzle 48. A mounting ring 50 is secured to the inlet flange 45 in surrounding relationship to it and is connected at its lower portion to a foot 57 which rests on a support stand 52, or the ground or other support surface. An open bottomed generally cylindrical shroud 51 is connected at the upstream end to the mounting ring 50. The downstream end of shroud 51 is supported by an arcuate yoke or semi-circular stand 53 connected to and supported by a downstream foot 54 (FIG. 9).

Inlet nozzle 48 has a uniform passage 55 leading from the discharge pipe 42 to an elongate, longitudinal generally cylindrical water extraction chamber 56. A housing 58 defines the chamber 56 and is comprised of a plurality of longitudinal, elongate spaced apart slats 59. Slats 59 are rectangular in cross-sectional shape, relatively wide and thin, with the cross-sectional length radially orientated with respect to the chamber 56. The slats are spaced apart to form elongate, unobstructed longitudinal openings or slots 60. Openings 60 are open between the discharge chamber 56 and the outside for purposes of water discharge.

Inlet nozzle 48 has a mounting flange 62 connected to the inlet flange 45 by a body portion 63 that is tapered inwardly in a downstream direction. All but one of the slats 59 are pivotally connected to the mounting flange 62 for limited pivotal movement. Each of the movable slats 59 has an inwardly facing notch 64 proximate the upstream end thereof. Each notch 64 is of a transverse dimension to loosely engage the edge of the mounting flange 62 so that limited pivotal movement is permitted. The corner of each movable slat 59 proximate the notch 64 is bevelled as at 66 in confrontation to the surface of the tapered body portion 63. A rigid retaining ring 67 extends around the slats 59 opposite the notches 64. The looseness or play of the slats 59 over the mounting flange 62 permits limited pivotal movement of each of the movable slats 59 within constraints imposed by the inwardly tapered body 63 of inlet nozzle 48 and the retaining ring 67. A range of movement of the movable slats 59 of only a few degrees is all is that is required.

The lowermost slat 59A is fixed. The upstream end has a notch 64A fixed to flange 62 by weld 68. A plate 70 fixed to the downstream foot 54 is fastened by suitable fasteners 71 to the downstream end of the fixed slat 59A. The fixed slat 59A functions as an anchor for the remaining movable slats 59 and, as shown in FIGS. 9 and 10, is somewhat wider and sturdier that the other slats.

A plurality of elastic or retainer rings surround the chamber 58 in engagement with the slats 59 in order to bias the slats 59 inwardly upon outward deflection. As shown, a first or upstream ring 73 surrounds them at an intermediate location, and a second or downstream ring 74 surrounds them at a downstream location near the discharge end 61. Elastic rings 73, 74 are formed of an elastic material of the type following the usual spring constant rule whereby the force generated by the member is linearly proportionate to the deflection. As shown in FIG. 10, each of the elastic rings is provided with a plurality of radial notches 75 arranged about the inner circumference thereof to accomodate the outer ends of the slats 59. In the relaxed orientation shown in FIG. 11, the rings 73, 74 hold the movable slats 59 in an inwardly converging orientation such that the chamber 56 is slightly convergent in a downstream direction. Slats 59 pivot outwardly against the bias of the elastic rings, 73, 74. The rings 73, 74 are longitudinally adjustable along the length of the slats 59 in order to vary the amount of force needed for a given angular deflection.

The upper tier of movable slats 59 can be provided with drainage openings 77 for drainage of water squeezed out in the vicinity of the slats.

In the use of the water separator 40, material is pumped through the discharge pipe 42 and through the passage 55 of inlet nozzle 48 to the water extraction chamber 56. The material is like that earlier described having a high water content and solids entrained in the water. The material is pumped into the chamber 56 to a point where compaction occurs. If necessary, compaction is precipitated by insertion of a plug in the chamber. Compaction results in pressure build-up that that expands the slats 59. At the same time, a large frictional force is imposed upon the material due to the compaction of the material as it moves along the slats. Under th influence of the frictional force and the squeezing force exerted by the slats, a large amount of water is squeezed from the subject mixture. As the subject mixture moves along and is more compacted, it obtains a somewhat higher density as indicated at 78A in FIG. 12. Once the subject mixture has achieved such a compacted state, it moves along nicely through the chamber 56 which generally, depending upon the nature of the material, will be slightly divergent.

The number of slats used in formation of chamber 58 and consequently the spacing between them, will vary dependent upon the intended use of the water separator and the material being treated, but for purposes of illustration and clarity, the number of slats shown in FIGS. 9 and 10 is fewer than will normally be used. In one particular device according to the embodiment of FIGS. 7 through 12, 96 slats are employed, spaced apart approximately 1/16 inch at chamber 56, the movable slats having a width of approximately 3/16 inch, a cross-sectional length of approximately six inches, and a length of chamber 56 of six feet.

For effective continuous water separation, when the subject mixture passes into the chamber 56 it is compacted to a density several times that of the entry material. Material moving in behind the already compacted material is then compacted itself, losing water in the process, subject to the higher frictional forces endured by the compacted material as well as the higher squeezing force of the slats. A relatively continuous flow of compacted material leaves the end of the chamber for subsequent disposition.

Figure 13:
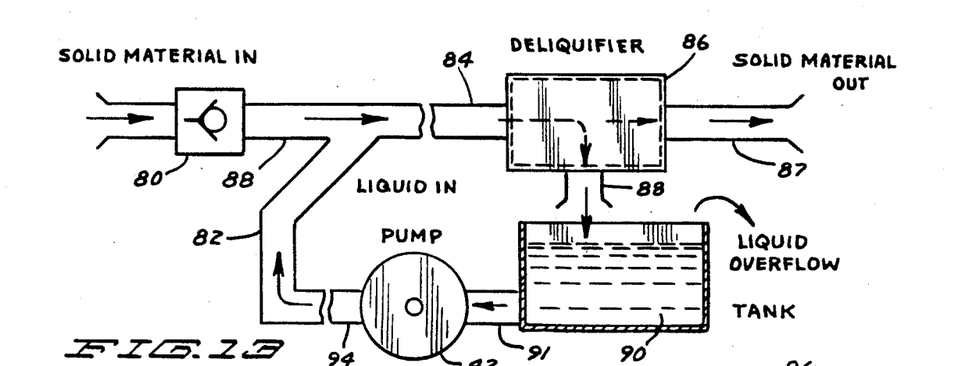
FIG. 13 is a schematic view of scheme for transport of solid discrete material by introduction of water and using a liquid separator.

Movement of solid discrete material of the type described is more efficiently accomplished when the material is entrained with water and the water used as a low friction conveyance medium. FIG. 13 depicts a scheme for transport of discrete solid material over a long distance by moving it in a water transport medium, then dewatering the subject mixture at the destination, and returning the water to be recycled.

As shown schematically in FIG. 13, discrete solid material partially entrained with water is pumped from an origination location by a solids material moving pump 80 through a relatively short initial transport pipe 81. Water is added at a water inlet pipe 82. The subject mixture now with a large amount of entrained water moves through a relatively long main transport pipe 84. This is accomplished under the pumping influence of the main solids material moving pump 80 alone or along with booster pumps (not shown) stationed along the way depending on the length of the main transport pipe 84, which can be several thousands of feet in length. At the destination location, the subject mixture is moved through a water separator or deliquifier 86 to remove a substantial amount of the entrained water which can include not only the water added for transport medium, but water initially entrained in the subject mixture as well. The solid material is removed through a discharge pipe 87 for further disposition. The removed water is directed through a water transfer conduit 88 to a water reservoir or tank 90. Since this can involve a greater amount of water than was initially added, suitable conventional liquid overflow means can be provided in connection with the tank 90 as indicated in the drawing. Another water transfer pipe 91 connects the tank 90 to a water pump 92. Water pump 92 pumps water upon demand through an elongate water transport pipe 94 substantially coextensive in length with the main transport pipe 84 for subject mixture. The water transport pipe 94 terminates in the juncture pipe 82 which delivers the water recycled to the main transport line 84 for further transport medium use. As needed, booster pumps may be provided along the return line 94 (not shown). Efficient use is made of the water as a transport medium. The subject mixture moves with low friction along the transport pipe 84 and is delivered at the final location in a relatively solid form.

Figure 14:
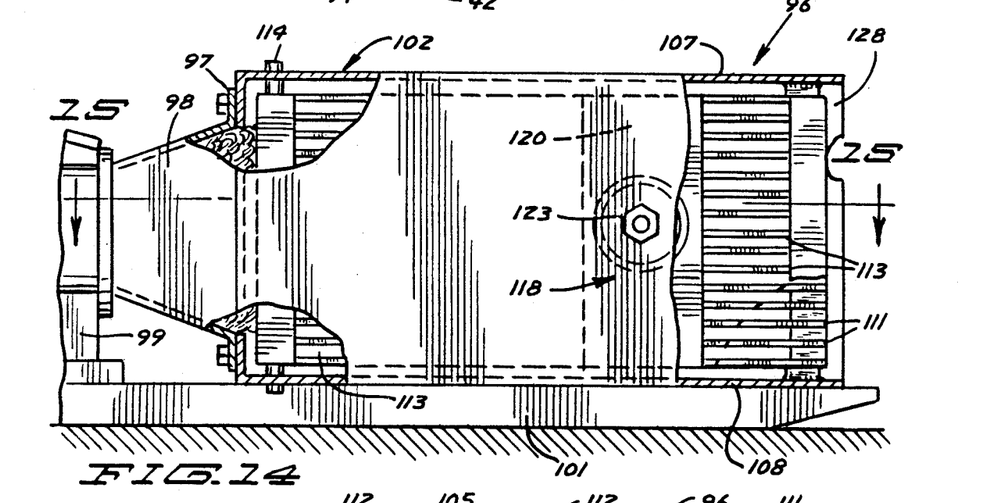
FIG. 14 is a side elevational view of a liquid separator according to a third form of the invention.
Figure 15:
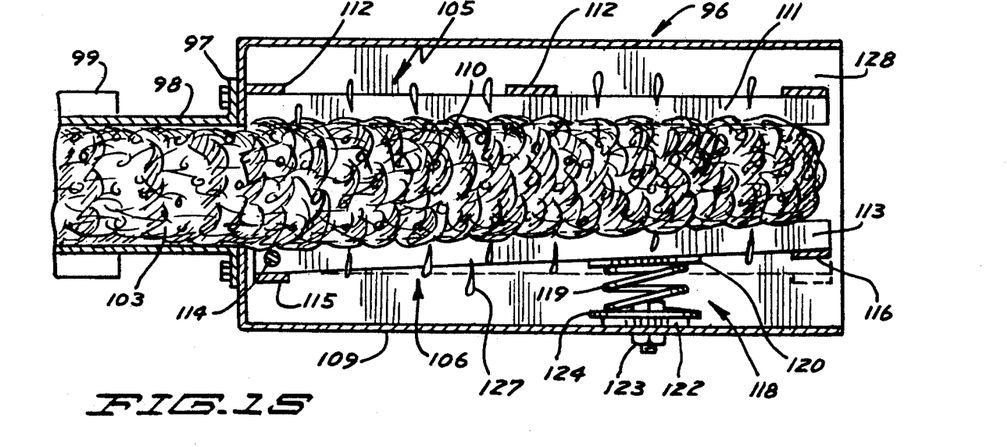
FIG. 15 is a sectional view of the liquid separator of FIG. 14 taken along the line 15—15 thereof.

Referring to FIGS. 14 and 15, there is shown a water separator according to a third form of the invention indicated at 96 connected to the outlet flange 97 of an outlet pipe 98 of a solids material moving pump 99 and mounted on a suitable support or platform 101. A rectangular shroud 102 is connected to the discharge pipe 98 and has a suitable opening permitting inlet of subject mixture 103. A housing within the shroud 102 is defined by a first upright or vertical fixed wall 105 and a second vertical movable wall 106 together with a top wall 107 of shroud 102 and the bottom wall 108 defining an extraction chamber 110. The fixed housing side wall 105 extends from the top wall 107 to the bottom wall 108 of shroud 102 and is comprised of a plurality of parallel, spaced apart slats 111 that are horizontally disposed and separated by spaces providing elongate longitudinal openings unobstructed along the length of the extraction chamber 110. The slats 111 are held in position by vertical mounting members 112 fixed to the upper and lower walls 107, 108 of the shroud 102.

Movable side wall 106 is comprised of a plurality of parallel, spaced apart horizontally disposed slats 113. The slats 113 are spaced apart to provide longitudinal elongate openings that extend unobstructed the length of the extraction chamber 110. A pivot bar 114 is connected between the upper and lower walls 107, 108 of shroud 102 near the inlet of the inlet pipe 98. A rear vertical strap 115 and a forward vertical strap 116 are connected to the horizontal slats 113 to form the rigid wall 106. The rear portions of the slats 113 pivotally engage the pivot rod 114 for pivotal movement of the wall 106 about a horizontal axis. A spring mechanism 118 acts between the interior of a side wall 109 of shroud 102 and the wall 106 to bias the wall 106 in a direction toward the opposite side wall 105. The spring mechanism 118 includes a helical spring 119 bearing against a plate 120 fixed to the side wall 106 at one end, and bearing against a bearing plate 122 against the side wall 108 of shroud 102 and secured thereby a nut and bolt assembly 123 passing through a mounting plate 124.

In use of water separator 96, water entrained material is pumped through the inlet pipe 98 into the extraction chamber 110. The walls 105, 106 can be initially configured in a slightly convergent relationship. As the subject material 103 passes into the chamber 110, it forms a blockage which can be precipitated by the introduction of a plug or by the convergence of the side walls. The blockage expands the volume of the chamber 110 resulting in increased pressure from the spring assembly 118 and from frictional forces as the subject mixture moves along the chamber. The squeezing force results in extraction of water 127 which falls to the floor of the shroud 102 and then out the outlet 128. Alternatively, other drainage provision could be provided. The solid material continues to the outlet 128 and exits centrally thereof for further disposition. The material is relatively solid and can become compacted proximate the center of the chamber 110 and moving easily therefrom.

Figure 16:
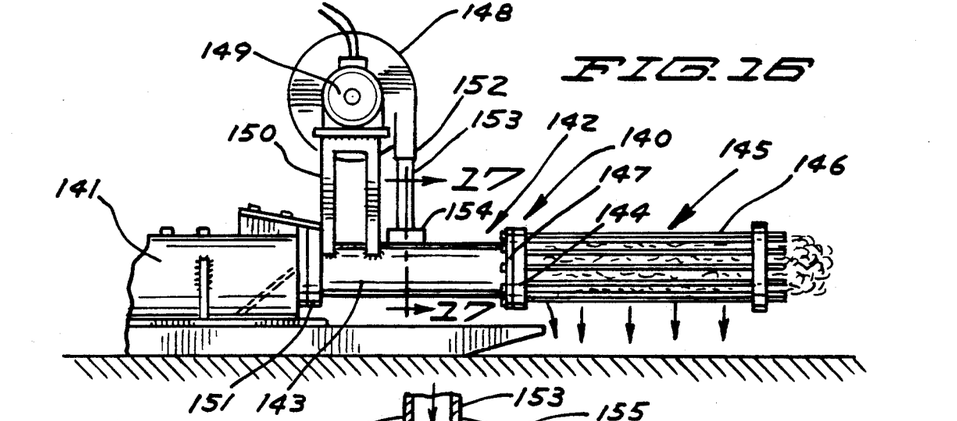
FIG. 16 is a side elevational view of a liquid separator according to a modification of the invention connected to a solid material moving pump.

Referring to FIG. 16, there is shown a modified liquid separator apparatus according to the invention indicated generally at 140 attached to the outlet end 141 of a solids moving pump. Apparatus 140 includes a transfer pipe 142 with a closed sidewall 143. Pipe 142 is connected in cantilever fashion with an open inlet end flange 151 connected to the outlet of the pump 141, and an open outlet end defined by flange 147 connected to the inlet flange 144 of a liquid separator 145. Liquid separator 145 has a porosity which is generated by a plurality of spaced apart slats 146. Liquid separator 145 can be constructed by way of example in the same manner as the liquid separator 10 shown in FIG. 1. Subject material is transferred into the pump and pumped through the outlet section 141, through the transition pipe 142 and into the liquid separator 146 for separation of entrained water.

Compressed air is introduced into the transition pipe to promote and accelerate the separation of water from the solid material. With respect to certain varieties of solid water entrained solid material, compressed air greatly enhances the dewatering characteristics of apparatus 140. An example of such material is water entrained turkey feathers. The addition of compressed air to the subject mixture at a location upstream of the liquid separator tends to initiate the dewatering process in the subject mixture before it reaches the liquid separator. This is particularly usuful where maximum separation of water from the solid material is desired.

Figure 17:
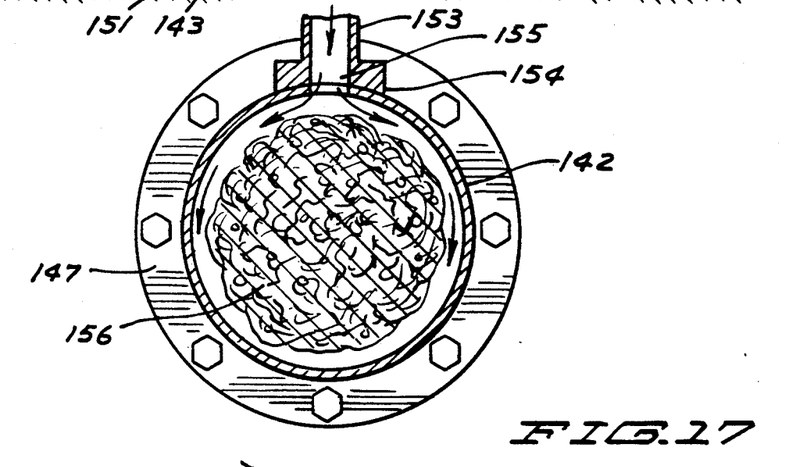
FIG. 17 is an enlarged sectional view of a portion of the apparatus of FIG. 16 taken along the line 17—17 thereof.

As shown in FIG. 16, a source of gas in air under pressure includes an air compressor 148 connected to an electric motor 149 that is situated on a stand 150 conveniently mounted on transfer pipe 142. The outlet 152 of compressor 148 is connected to an air line 153 communicating with the interior of transfer pipe 142 by way of a fitting 154 providing air inlet opening 155. As shown in FIG. 17, subject mixture 156 is being passed through the transfer pipe 142. The air enters the transfer pipe through air inlet opening 155 at the fitting 154 and, following a path of least resistance, moves downstream next to the interior walls of the transfer pipe 142. The air creates a pressure gradient through the subject mixture 156 which tends to displace the water. The water is moved ahead of the solid material in which it is entrained by virtue of the air pressure. This accelerates the dewatering process causing the water to flow out of the liquid separator 146 at the upstream end thereof where it is joined to the transfer pipe 142. Because of the denser mixture of solid material at the upstream end of the transfer pipe 142, the air moves downstream rather than upstream. The addition of compressed air to the transfer pipe results in a higher pressure gradient in the transfer pipe without the addition of subject material. Because of the greater efficiency achieved in dewatering, smaller dewatering equipment can be used, at a corresponding cost savings. The water forced from the subject material flows along the side walls of the transfer pipe 142 until it is discharged at the upstream end of the liquid separator 146. The compressed air exerts a continuous pressure gradient upon the solid material to continuously cause water to be forced therefrom.

Figure 18:
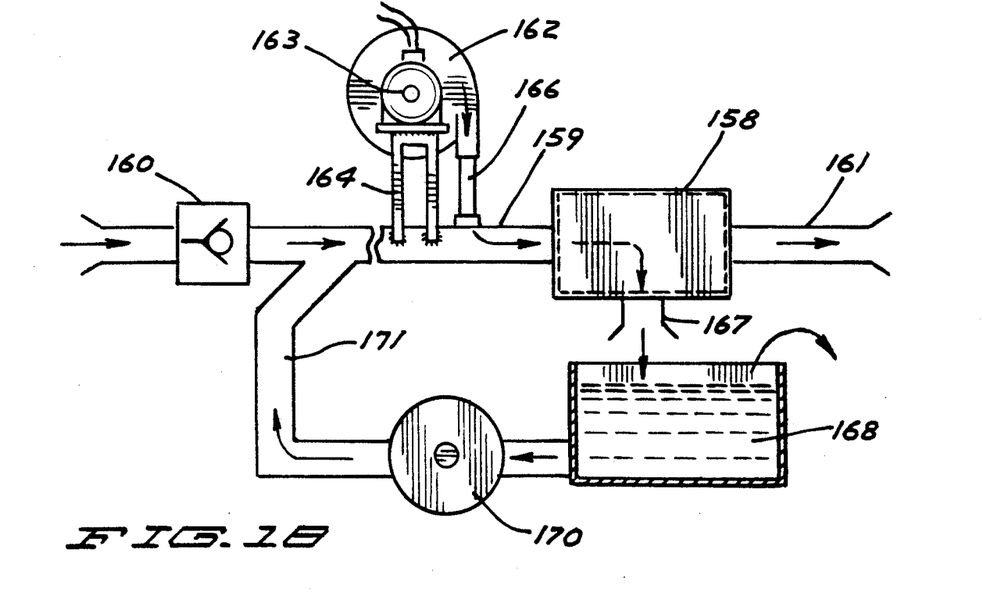
FIG. 18 is a schematic view of a scheme for accelerating the dewatering of a solid material through the introduction of compressed air.

FIG. 18 illustrates the method of dewatering liquid entrained solid material through the addition of compressed air. A liquid separator 158 is located at the downstream end of a transport pipe 159 and has a solids discharge pipe 161. A solids pump 160 is located to pump material into the transport pipe. An air compressor 162 located upstream of the solids pipe 160 introduces air under pressure to the transport pipe 159. An electric motor 163 drives the air compressor 162 and is mounted on a stand 164. An air line 166 is connected between the compressor 162 and the interior of transport pipe 159. Solid, liquid entrained material is introduced into the pump 160 where it is pumped through the transport pipe 159 and through the liquid separator 158. At an intermediate location the air under pressure is introduced into the transport pipe 159. The greater the distance between the introduction of air into the transport pipe 159 and the inlet to the liquid separator 158, the greater the water separation prior to entering the liquid separator 158. The transport pipe 159 can be of a suitable length for transport of the solid material from one place to another.

The method of the scheme of FIG. 18 is also usuable for efficient transport of solid descrete material from one location to another through the addition and subsequent separation of water. Water separated at the liquid separator 158 is transferred through a transfer pipe 167 to a water reservoir 168. Reservoir water is pumped through a pump 170 to a water return line 171 which introduces water into subject mixture at a location in the transport pipe 159 that is upstream of the air compressor 162. Transport pipe 169 can be relatively long for transport of material from one place to another.

While there have been-shown and described certain preferred embodiments of a water separator according to the invention, it will be apparent that certain deviations can be had without departing from the scope and spirit of the invention.

The embodiments of the invention in which an exclusive property or privilege is claimed are defined as follows:

1. A method of transport of a subject mixture of discrete solid material from an origination location to a destination location through addition of water to the subject mixture, transporting the mixture, then removal of water, comprising:
feeding the subject mixture from the origination location into a reciprocating, solid materials moving pump;
using the solid materials moving pump for pumping the subject mixture through a main transport pipe;

adding an amount of water to the subject mixture into the pipe downstream of the pump to facilitate movement of it through the main transport pipe;

continued pumping of the subject mixture for moving the subject mixture through the main transport pipe to a destination location having a liquid separator device;

introducing air under pressure into the main transport pipe as the subject mixture is moved through it, and moving the subject mixture through the liquid separator device to remove water.

2. A method of transport of a subject mixture of discrete solid material from an origination location to a destination location comprising:

pumping the subject mixture from the origination location through a main transport pipe with a first pump;

adding an amount of water to the subject mixture into the pipe downstream of the pump to facilitate movement of it through the main transport pipe;

continued pumping of the subject mixture for moving the subject mixture through said main transport pipe to a destination location having a liquid separator device;

introducing air under pressure into the transport pipe as the subject mixture is moved through it;

moving the subject mixture through the liquid separator device to remove excess water;

the step of moving the subject mixture into a liquid separator device including moving the subject mixture into a liquid separator device with porous side walls and extracting water through the side walls.

3. The method of transport of a subject mixture of claim 2 including:

removing the excess water from the liquid separator apparatus to a water storage reservoir;

pumping the removed water back through a return water transport pipe to a water inlet of the main transport pipe proximate the first pump.

4. A method of transport of solid discrete material from an origination location to a destination location through addition of water to the material, transporting the material, then removal of the water, comprising:

feeding the solid discrete material from the origination location into a reciprocating, solid materials moving pump;

using the solid materials moving pump for pumping the solid discrete material through a main transport pipe;

adding an amount of water to the solid discrete material at a water inlet of the main transport pipe downstream of the pump, in an amount sufficient to facilitate movement of it through the main transport pipe;

pumping the mixture of water and solid discrete material through said main transport pipe to the destination location;

removing an amount of water from the mixture at the destination location using a liquid separator apparatus;

extracting the solid material from the liquid separator apparatus;

passing the removed the water from the liquid separator apparatus to a water storage reservoir;

pumping the stored water back through a return water transport pipe to the water inlet of the main transport pipe.

* * * * *

UNITED STATES PATENT AND TRADEMARK OFFICE
CERTIFICATE OF CORRECTION

PATENT NO. : 5,219,468
DATED : June 15, 1993
INVENTOR(S) : DAVID A. OLSON

It is certified that error appears in the above-identified patent and that said Letters Patent is hereby corrected as shown below:

```
Column 2, line 15, "froms" should be ---forms---.
Column 4, line 27, "reslutant" should be ---resultant---.
Column 5, line 47, "silgage" should be ---silage---.
Column 6, line 49, second occurrence, delete "is".
Column 7, line 22, second occurrence, delete "that".
Column 7, line 25, "th" should be ---the---.
Column 9, line 51, "usuful" should be ---useful---.
Column 10, line 39, "usuable" should be ---usable---.
Column 10, line 40, "descrete" should be ---discrete---.
Column 12, line 29, second occurrence, delete "the".
```

Signed and Sealed this

First Day of February, 1994

Attest:

BRUCE LEHMAN

Attesting Officer

Commissioner of Patents and Trademarks